US007639692B2

United States Patent
Papadimitriou

(10) Patent No.: US 7,639,692 B2
(45) Date of Patent: Dec. 29, 2009

(54) UNIFIED INVERSE ADDRESS RESOLUTION

(75) Inventor: Dimitri Papadimitriou, Brussels (BE)

(73) Assignee: Alcatel, Paris (FR)

( * ) Notice: Subject to any disclaimer, the term of this patent is extended or adjusted under 35 U.S.C. 154(b) by 511 days.

(21) Appl. No.: 11/541,638

(22) Filed: Oct. 3, 2006

(65) Prior Publication Data

US 2007/0076725 A1   Apr. 5, 2007

(30) Foreign Application Priority Data

Oct. 5, 2005   (EP)   ................................. 05292084

(51) Int. Cl.
*H04L 12/28* (2006.01)
(52) U.S. Cl. ............. 370/395.2; 370/395.3; 370/395.51
(58) Field of Classification Search ................. 370/397, 370/399, 395.31, 395.32, 395.5, 395.52, 370/395.54
See application file for complete search history.

(56) References Cited

U.S. PATENT DOCUMENTS

| | | | | |
|---|---|---|---|---|
| 6,189,041 | B1 * | 2/2001 | Cox et al. ................... | 709/238 |
| 6,898,200 | B1 * | 5/2005 | Luciani ....................... | 370/352 |
| 6,925,080 | B2 * | 8/2005 | Denecheau et al. ......... | 370/392 |
| 7,009,983 | B2 * | 3/2006 | Mancour .................... | 370/401 |
| 7,039,687 | B1 * | 5/2006 | Jamieson et al. ............ | 709/220 |
| 2003/0088699 | A1 * | 5/2003 | Luciani et al. .............. | 709/243 |
| 2004/0085997 | A1 | 5/2004 | Mancour | |

OTHER PUBLICATIONS

Jaeho You e tal, "Design of the packet forwarding architecture of the ATM based PLS edge node", Networks, 2000. (ICON 2000). Proceedings. IEEE International Conference on Sep. 5-8, 2000, Piscatway, NJ, USA IEEE Sep. 5, 2000, pp. 431-435 XP0105141347.
Bradley et al, "Inverse Address Resolution Protocol", IETF Standard, Internet Engineering Task Force, IETF, CH, Sep. 1998, XP0105008174.
Awduche et al, "RSVP-TE: Extensions to RSVP for LSP Tunnels", IETF Standard, Internet Engineering Task Force, IETF, CH, Dec. 2001, XP015008988.

* cited by examiner

*Primary Examiner*—Jayanti K Patel
*Assistant Examiner*—Bo Hui A Zhu
(74) *Attorney, Agent, or Firm*—Carmen Patti Law Group, LLC

(57) ABSTRACT

The present invention provides a technique for conveying Inverse Address Resolution Protocol (InARP) packets between a source node and an end node. A data path is established through a data communication network between the source node and the end node by exchanging signaling messages between network nodes along the data path. InARP requests are sent through the control address space used for controlling the operation of the network. At the source node, a common path identifier that identifies the data path is encoded into a request that is sent to the end node for identifying a particular data path that terminates at that end node, and for returning a data network address associated with that data path.

11 Claims, 3 Drawing Sheets

UNIFIED INVERSE ADDRESS RESOLUTION

Figure 1:
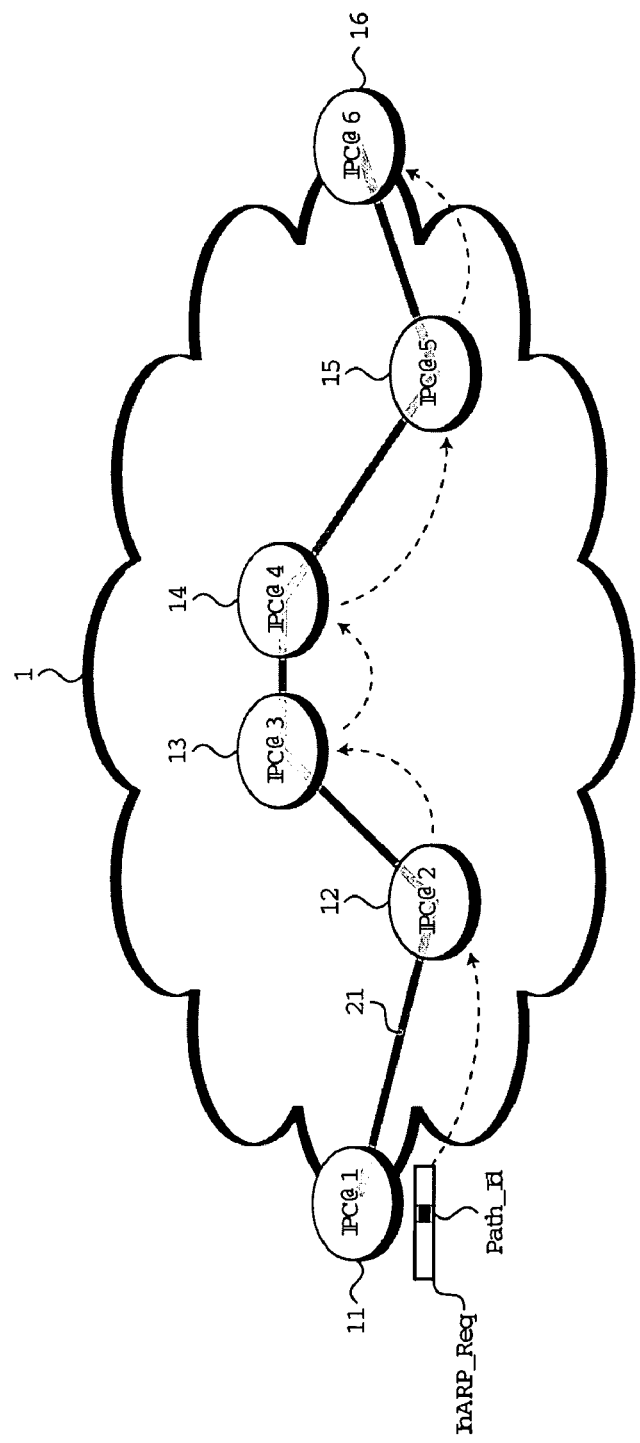

The present invention relates to a method for resolving hardware addresses into network addresses, which method comprising the steps of:

establishing a data path through a data communication network between a source node and an end node, which data path being established by exchanging signaling messages between network nodes along said data path, which signaling exchanges relying upon control network addresses for addressing said network nodes through said data communication network, at said source node, sending a request whereby a particular hardware address associated with said data path is to be resolved into a network address.

Such a method is known from the art and is described in the Request For Comments (RFC) 2390 entitled *"Inverse Address Resolution Protocol"*, published by the Internet Engineering Task Force (IETF) in September 1998.

RFC 2390 discloses a method that allows a sender device (or host or station) to request a network address (or protocol address or logical address) corresponding to a given hardware address (or physical address), and more specifically a method that allows a frame relay sender device to discover the network address of a target device associated with a frame relay Virtual Circuit (VC), being a Permanent Virtual Circuit (PVC) or a Switched Virtual Circuit (SVC), which virtual circuit being identified by a Data Link Connection Identifier (DLCI) that has local significance only, and that can be thought as the frame relay equivalent to a hardware address.

This method is referred to as Inverse Address Resolution Protocol (InARP), and allows discovery of adjacent node's network addresses.

InARP packets are typically encapsulated by means of an encapsulation method associated with the native data plane conveying the InARP packets. For example, InARP packets are encapsulated into frame relay frames using Network Level Protocol Identity (NLPID) and Sub Network Access Protocol (SNAP) encapsulation method.

It is an object of the present invention to provide a more efficient method for conveying InARP packets between the source node and the end node.

According to the invention, this object is achieved due to the fact that said method further comprises the steps of:

at said source node, encoding into said request a common path identifier whereby said data path can be identified, and sending said request with as destination network address a particular control network address of a particular network node along said data path, which request being further forwarded towards said end node, at said end node, identifying said data path from said common path identifier, determining whether said data path terminates at said end node, and returning to said source node a particular data network address associated with said data path.

Instead of forwarding InARP requests in-band, that is to say by means of the data path established between the source node and the end node, InARP requests are sent through the control address space that is used for controlling the operation of the network.

A path identifier that has been used as a common reference during path establishment, and that has network-wide significance, is encoded into the request, which path identifier being further used at the end node for identifying a particular data path that terminates at that end node, and for returning a data network address associated with that data path.

An example of signaling protocol is Resource reSerVation Protocol—Traffic Engineering (RSVP-TE), which signaling protocol being used interalia for establishing a Label Switch Path (LSP) through a Generalized Multi Protocol Label Switching (GMPLS) based network.

A method according to the invention is advantageous in that a unified inverse address resolution scheme can be used over various underlying data link layers, without the need for customized encapsulation methods and corresponding encoding/decoding means.

A further embodiment of a method according to the invention is characterized in that said particular control network address is a control network address of an intermediate network node along said data path, and in that said method further comprises the steps of, at said intermediate network node, deriving from said common path identifier a further control network address of a further next hop along said data path, and forwarding said request to said further next hop with as destination network address said further control network address.

In this embodiment, the InARP request is sent from the source node to an intermediate network node along the data path, and typically to the intermediate network node with which an adjacency has been set up in the control plane for establishing the data path.

The InARP request may also be sent to a further network node along the data path, provided its control network address is known at the source node.

At any intermediate node along the data path, processing of an InARP request consists in looking at the path identifier, and in using that path identifier to derive the network address of a next hop (or next intermediate network node) further along the data path whereto forward the InARP request. In RSVP-TE for example, this address corresponds to the so-called N-HOP address.

The same mechanism may apply in reverse direction for returning InARP responses.

This embodiment is advantageous in that it relies upon path state information maintained at each and every intermediate network node, which state information being used for retrieving the network address of a further network node whereto forward the InARP packets for them to reach their destination, namely the end node for InARP requests and the source node for InARP responses.

Another embodiment of a method according to the invention is characterized in that said particular control network address is a control network address of said end node.

In this alternative embodiment, the request is directly sent to the end node, provided its control network address is known at the source node. In RSVP-TE for example, this address corresponds to the so called tunnel end point address.

In this embodiment, the request may follow a route that is different from the route the data path follows.

Still another embodiment of a method according to the invention is characterized in that said request is encapsulated over a common network layer used throughout said data communication network.

The network layer is for instance an Internet Protocol (IP) layer.

This embodiment is further advantageous in that a common encapsulation method can be used irrespective of the signaling protocol suite being used, and irrespective of the type of data path being established.

The present invention also relates to a network node adapted to exchange signaling messages with further network nodes for establishing a data path through a data communication network, which signaling exchanges relying upon control network addresses for addressing said network node and said further network nodes through said data communication network, and comprising a communication unit adapted to receive a request originating from a source node whereby a particular hardware address associated with said data path is to be resolved into a network address.

A network node according to the invention is characterized in that said communication unit is further adapted to receive said request with as destination network address a particular control network address of said network node, and in that said network node further comprises a resolution unit coupled to said communication unit, and adapted to identify said data path from a common path identifier, which common path identifier being encoded by said source node into said request, to determine whether said data path terminates at said network node, and if so, to return to said source node a particular data network address associated with said data path.

A further embodiment of a network node according to the invention is characterized in that, in the event of said data path not terminating at said network node, said resolution unit is further adapted to derive from said common path identifier a further control network address of a further next hop along said data path, and in that said communication unit is further adapted to forward said request to said further next hop with as destination network address said further control network address.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

Figure 2:
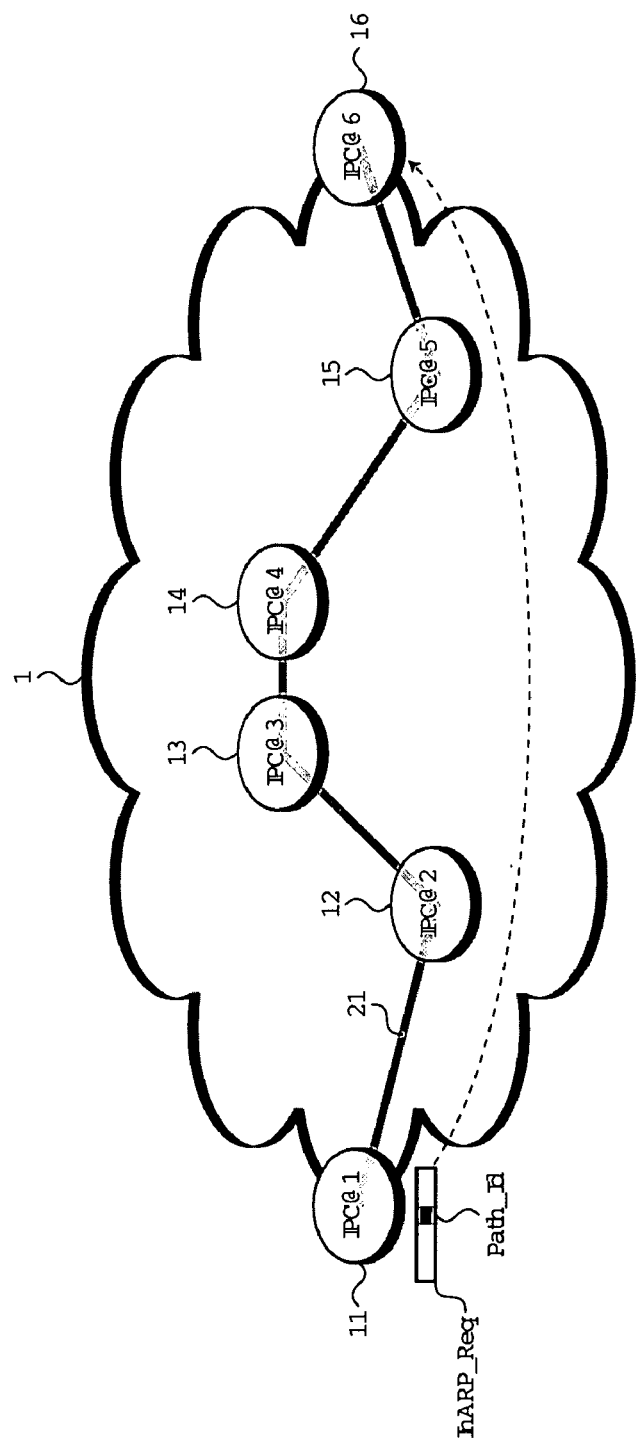
Figure 3:
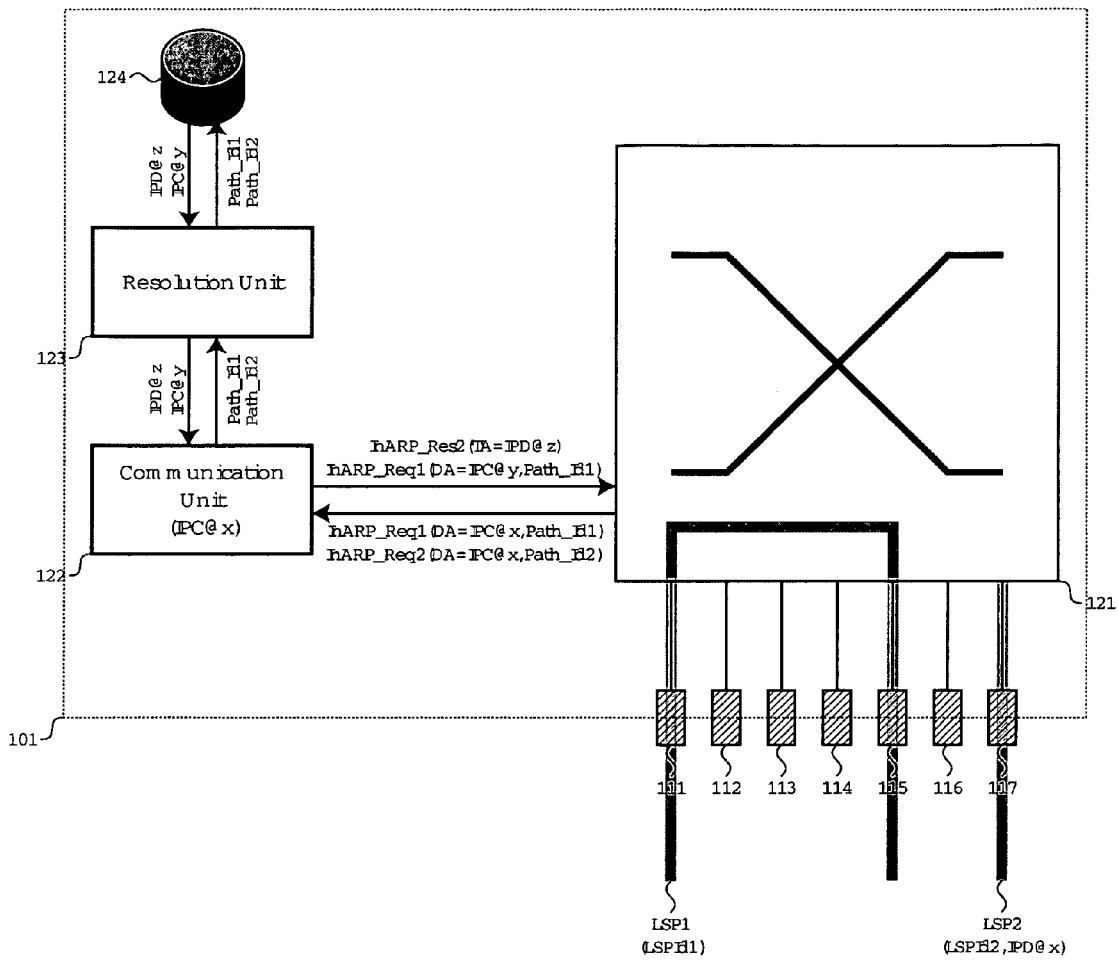

The above and other objects and features of the invention will become more apparent and the invention itself will be best understood by referring to the following description of an embodiment taken in conjunction with the accompanying drawings wherein:

FIG. 1 represents a first operation of a data communication system according to the invention, FIG. 2 represents a second operation of a data communication system according to the invention, FIG. 3 represents a network node according to the invention.

There is seen in FIG. 1 a data communication network 1 comprising network nodes 11 to 16 adapted to switch units of data between their ingress and egress ports.

The network nodes 11 to 16 may operate in any of the following switching domains:
packet-based switching, such as IP routers, MPLS switches, Ethernet switches,
cell-based switching, such as Asynchronous Transfer Mode (ATM) switches,
time-based switching, such as Time Division Multiplexing (TDM), Synchronous Data Hierarchy (SDH) or Synchronous Optical NETwork (SONET) add-&-drop multiplexers or cross-connect systems,
wavelength-based switching, such as Dense Wavelength Division Multiplexing (DWDM) devices,
physical-based switching, such as Optical Cross Connect (OXC) devices.

A path 21 is established through the network 1 between the network node 11, further referred to as the source node, and the network node 16, further referred to as the end node, via the intermediate network nodes 12 to 15.

Examples of data paths established through a data communication network are:
a LSP,
an ATM VC or Virtual Path (VP),
a frame relay VC.

In a preferred embodiment of the present invention, the network nodes 11 to 16 establish the path 21 by exchanging RSVP-TE signaling messages. The path 21 may traverse further intermediate network nodes (not shown) that are not involved in signaling exchanges.

An hardware address uniquely identifies a physical interface coupled to a network, or an aggregation of more than one such physical interfaces. Hardware addresses have local significance only and are substituted for while packets are traveling over the network. An hardware address may also identifies a virtual interface that is logically defined over one or more physical interfaces.

Examples of hardware addresses are:
a Medium Access Control (MAC) address, such as an Ethernet address,
a DLCI of a frame relay VC,
a Virtual Path Identifier (VPI) and/or a Virtual Channel Identifier (VCI) of a ATM VC or VP,
a Service Access Point Identifier (SAPI) of a SDH/SONET container.

A network address identifies a particular recipient of some network traffic, and has network-wide significance so as traffic can travel through the network towards a particular destination.

In a preferred embodiment of the present invention, the network addresses are IP addresses.

For a better insight of the invention, network addresses are further split into data network addresses and control network addresses.

Data network addresses are used for conveying network traffic (or payload traffic), as opposed to control network addresses that are used for operating the network, such as establishing a path, releasing a path, exchanging further path information, etc.

For operating a network, a node establishes control adjacencies with one or more network nodes, which control adjacencies making use of the aforementioned control network addresses for exchanging signaling messages (or control traffic).

Purposely, the network nodes 11 to 16 are assigned the control IP addresses IPC@1 to IPC@6 respectively.

There is seen in FIG. 3 a network node 101 comprising the following functional blocks:
physical ports 111 to 117,
a switching unit 121,
a communication unit 122
a resolution unit 123,
a local repository 124.

The switching unit 121 is coupled to the physical ports 111 to 117, and to the communication unit 122. The resolution unit 123 is coupled to the communication unit 122 and to the local repository 124.

The physical ports 111 to 117 are adapted to receive and transmit physical signals, being an electrical signal, an optical signal, or a radio electro-magnetic signal.

The switching unit 121 is adapted to switch a signal (e.g., a wavelength), or a unit of data conveyed thereby (e.g., an IP packet, an MPLS packet, an ATM cell, a SDH container), from any ingress port towards any egress port. Switching is driven by a forwarding, routing, binding or cross-connect table.

The switching unit 121 is further adapted to switch IP packets towards the appropriate destinations. A destination IP address is decoded from an incoming IP packet, and the closest match is looked for in a routing table (not shown) to find out the particular (physical or logical) interface whereto forward that packet.

The network node 101 is assigned the control network address IPC@x, and as such IP packets bound to that IP address are routed towards an internal port, whereat they are further segregated and dispatched towards the appropriate applications.

In a preferred embodiment of the present invention, InARP packets are encapsulated over IP, and are distinguishable by means of a particular protocol value in the IP header.

The communication unit 122 is the recipient of IP packets bound to the network address IPC@x (see DA=IPC@x in FIG. 3), the protocol value of which designates InARP. The communication unit 122 is adapted to decode a common path identifier from an incoming InARP request, and to supply the resolution unit 123 therewith.

In a preferred embodiment of the present invention, the common path identifier is assumed to be the combination of the following information elements:
- the IPv4/v6 TUNNEL SENDER ADDRESS of the SENDER_TEMPLATE object included in RSVP path message.
- the LSP ID of the SENDER_TEMPLATE object included in RSVP path message,
- the IPv4/v6 TUNNEL END POINT ADDRESS of the SESSION object included in either RSVP path or RSVP resv message,
- the TUNNEL ID, possibly in combination with the EXTENDED TUNNEL ID, of the SESSION object included in either RSVP path or RSVP resv message.

Please refer to RFC 3209, Awduche et al., December 2001, chapter 4.6., for further information about the exact meaning of those information elements and their encoding into RSVP message.

Any other logical identifier(s) that unambiguously identifies a particular LSP, and that has network-wide significance, could be used as well.

The local repository 124 holds path state information for each and every configured LSP, which path state information comprising the following information elements:
- the network address of the previous hop for that path, as retrieved from RSVP_HOP object in RSVP path messages,
- the network address of the next hop for that path, as retrieved from RSVP_HOP object in RSVP resv messages,
- the network address of the source node, or equivalently the IPv4/v6 TUNNEL SENDER ADDRESS of the SENDER_TEMPLATE object included in RSVP path message,
- the network address of the end node, or equivalently the IPv4/v6 TUNNEL END POINT ADDRESS of the SESSION object included in either RSVP path or RSVP resv message,
- the logical identifier of that path, or equivalently the combination of the LSP ID, the TUNNEL ID and possibly the EXTENDED TUNNEL ID.

The resolution unit 123 is adapted to determine whether the network node 101 is the end node for a particular LSP by comparing the IPv4/v6 TUNNEL END POINT ADDRESS with its own control network address(es), presently by checking whether IPv4/v6 TUNNEL END POINT ADDRESS matches IPC@x value. A special flag indicating the outcome of this check is further held in the local repository 124 along each corresponding path entry.

An operation of the network node 101 follows.

2 LSPs are assumed to be established that involve the network node 101. A first LSP LSP1 traverse the network node 101 and terminates at a further network node, while a second LSP LSP2 terminates at the network node 101. The LSP LSP1 is identified by means of a first path identifier Path_Id1, while the LSP LSP2 is identified by means of a second path identifier Path_Id2.

The path identifiers Path_Id1 and Path_Id2 includes the aforementioned information elements.

A first InARP request InARP_Req1, which is bound to the destination address IPC@x, and includes Path_Id1 as path identifier, is received by the network node 101, and passed by the switching unit 121 to the communication 122.

The communication unit 122 decodes a path identifier from the InARP_req1, presently Path_Id1, and forwards the path identifier Path_Id1 to the resolution unit 123.

The resolution unit 123 interrogates the path state database in the local repository 124 with the path identifier Path_Id1, and determines whether the LSP identified by Path_Id1, presently LSP1, terminates at the node 101 by checking the corresponding flag.

Presently, the path LSP1 does not terminate at the node 101. Consequently, the resolution unit 123 reads the next hop address associated with the path identifier Path_Id1, presently IPC@y, and returns this piece of information to the communication unit 122.

The communication unit 122 encodes the control network address IPC@y as the destination IP address of the InARP request InARP_req1 (see DA=IPC@y in FIG. 3), and sends the so modified request to the switching unit 121 for further transmission towards the appropriate egress port.

A second InARP request InARP_Req2, which is bound to the destination address IPC@x, and includes Path_Id2 as path identifier, is received by the network node 101, and passed by the switching unit 121 to the communication 122.

The communication unit 122 decodes a path identifier from the InARP_req2, presently Path_Id2, and forwards the path identifier Path_Id2 to the resolution unit 123.

The resolution unit 123 interrogates the path state database in the local repository 124 with the path identifier Path_Id2, and determines whether the LSP identified by Path_Id2, presently LSP2, terminates at the node 101 by checking the corresponding flag.

Presently, the path LSP2 does terminate at the node 101. Consequently, the resolution unit 123 determines the data network address associated with the LSP identified by Path_Id1, presently IPD@z, and returns this piece of information to the communication unit 122.

The communication unit 122 encodes an InARP response InARP_res with as target network address the data network address IPD@z as (see TA=IPD@z in FIG. 3), and sends the InARP response InARP_res to the switching unit 121 for further transmission towards the appropriate egress port, which response reaching the source node of the LSP LSP2.

It is to be noticed that control and data traffic may be handled by distinct switching units, and/or may go through distinct physical ports.

A further operation of the data communication system of FIG. 1 follows, assuming the network nodes 11 to 16 implements the aforementioned technical features of the network node 101.

The source node 11 wants to resolve a particular hardware address associated with the path 21, the identifier of which is Path_Id, into a data network address, e.g. for establishing a Borger Gateway Protocol (BGP) peering relationship with another BGP speaker.

The source node encodes an InARP request InARP_req with as hardware address to resolve that particular hardware address, as common path identifier Path_Id, and as IP destination address the next hop address as retrieved from the path state database, presently IPC@2. The InARP request InARP_req is then send through the network 1 towards the network node 12 (see leftmost dashed arrow in FIG. 1).

The network node 12 checks whether the path identified by Path_Id terminates at that node, which presently is not the case, then encodes the next hop's address as retrieved from its path stat database, presently IPC@3, as destination IP address of the InARP request InARP_req, and forwards the so-modified InARP_req to this next hop, which request thereby reaching the end node 16 (see further dashed arrows in FIG. 1).

The end node 16 checks whether the path identified by Path_Id terminates at that node, which presently is the case, and encodes an InARP response with a particular data network address as target network address associated with the particular hardware address. The InARP response is either send to the previous hop, presently the network node 15, or directly to the source node 11 by reading its network address from the path state database.

There is seen in FIG. 2 an alternative operation of the data communication system, wherein the source node uses the tunnel end point network address, presently IPC@6, as destination IP address of the InARP request InARP_req, and sends the InARP request InARP_req directly to the end node 16.

Again, the InARP response is either send to the previous hop, presently the network node 15, or directly to the source node 11.

In still an alternative embodiment of the present invention, InARP packets are encapsulated over User Datagram Protocol (UDP), and are distinguishable by means of a particular UDP port number.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for resolving hardware addresses into network addresses, the method comprising the steps of:

establishing a data path through a data communication network between a source node and an end node, said data path being established by exchanging signaling messages between network nodes along said data path, which signaling exchanges relying upon control network addresses for addressing said network nodes through said data communication network, at said source node, sending a request wherein a particular hardware address associated with said data path is to be resolved into a network address, at said source node, encoding into said request one or more common path identifiers where said data path can be identified, at least one of said one or more common path identifiers being an IPv4/v6 TUNNEL SENDER ADDRESS of a Resource reSerVation Protocol (RSVP) path message, and sending said request with as destination network address a particular control network address of a particular network node along said data path, said request being further forwarded towards said end node, and at said end node, identifying said data path from said common path identifier, determining whether said data path terminates at said end node, and returning to said source node a particular data network address associated with said data path.

2. The method of claim 1, wherein said particular control network address is a control network address of an intermediate network node along said data path, at said intermediate network node, deriving from said common path identifier a further control network address of a further next hop along said data path, and forwarding said request to said further next hop with as destination network address said further control network address.

3. The method of claim 1, wherein said particular control network address is a control network address of said end node.

4. The method of claim 1, wherein said request is encapsulated over a common network layer used throughout said data communication network.

5. The method of claim 1, wherein another one of said one or more common path identifiers is a Label Switch Path (LSP) ID of a SENDER_TEMPLATE object of a RSVP path message.

6. The method of claim 1, wherein another one of said one or more common path identifiers is an IPv4/v6 TUNNEL END POINT ADDRESS of a SESSION object of a RSVP path message.

7. The method of claim 1, wherein another one of said one or more common path identifiers is an IPv4/v6 TUNNEL END POINT ADDRESS of a SESSION object of a RSVP resv message.

8. The method of claim 1, wherein another one of said one or more common path identifiers is a TUNNEL ID of a SESSION object of a RSVP path message.

9. The method of claim 1, wherein another one of said one or more common path identifiers is a TUNNEL ID of a SESSION object of a RSVP resv message.

10. A network node adapted to exchange signaling messages with further network nodes for establishing a data path through a data communication network, which signaling exchanges relying upon control network addresses for addressing said network node and said further network nodes through said data communication network, and comprising a communication unit adapted to receive a request originating from a source node wherein a particular hardware address associated with said data path is to be resolved into a network address, said communication unit being adapted to receive said request with as destination network address a particular control network address of said network node, said network node further comprises a resolution unit coupled to said communication unit, said resolution unit being adapted to identify said data path from one or more common path identifiers, said one or more common path identifiers being encoded by said source node into said request to determine whether said data path terminates at said network node, at least one of said one or more common path identifiers being an IPv4/v6 TUNNEL SENDER ADDRESS of a Resource reSerVation Protocol (RSVP) path message, and if so, to return to said source node a particular data network address associated with said data path.

11. The network node of claim 10 wherein, in the event of said data path not terminating at said network node, said resolution unit is further adapted to derive from said common path identifier a further control network address of a further next hop along said data path, said communication unit is further adapted to forward said request to said further next hop with as destination network address said further control network address.

* * * * *

UNITED STATES PATENT AND TRADEMARK OFFICE
CERTIFICATE OF CORRECTION

PATENT NO. : 7,639,692 B2  Page 1 of 1
APPLICATION NO. : 11/541638
DATED : December 29, 2009
INVENTOR(S) : Dimitri Papadimitriou It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Twenty-first Day of December, 2010

David J. Kappos
*Director of the United States Patent and Trademark Office*